(12) United States Patent
McKay et al.

(10) Patent No.: US 6,235,853 B1
(45) Date of Patent: May 22, 2001

(54) SLURRY POLYMERIZATION PROCESS USING AN UNSUPPORTED PHOSPHINIMINE CATALYST

(75) Inventors: Ian McKay; Dusan Jeremic; Qinyan Wang; P. Scott Chisholm, all of Calgary (CA)

(73) Assignee: Nova Chemicals (International) S.A.

( * ) Notice: Subject to any disclaimer, the term of this patent is extended or adjusted under 35 U.S.C. 154(b) by 0 days.

(21) Appl. No.: 09/440,613

(22) Filed: Nov. 15, 1999

(30) Foreign Application Priority Data

Nov. 25, 1998 (CA) .................................................. 2254512

(51) Int. Cl.⁷ .................................. C08F 2/08; C08F 4/16
(52) U.S. Cl. ........................... 526/89; 526/126; 526/127; 526/161; 526/943; 526/160; 526/348.6; 526/336; 502/155
(58) Field of Search .................................... 526/126, 127, 526/161, 943, 348.6, 347, 336, 89; 502/155

(56) References Cited

U.S. PATENT DOCUMENTS

| | | |
|---|---|---|
| 4,325,849 | 4/1982 | Rosen et al. . |
| 5,132,380 | 7/1992 | Stevens et al. . |
| 5,198,401 | 3/1993 | Turner et al. . |
| 5,684,097 | 11/1997 | Palmroos et al. . |
| 5,965,677 * | 10/2000 | Stephen et al. ....................... 526/129 |
| 6,013,745 * | 1/2000 | McKay et al. ....................... 526/132 |
| 6,063,879 * | 5/2000 | Stephen et al. ....................... 526/127 |
| 6,133,387 * | 10/2000 | Xu et al. ............................. 526/172 |
| 6,147,172 * | 11/2000 | Brown et al. ........................ 526/126 |

* cited by examiner

Primary Examiner—David W. Wu
Assistant Examiner—R. Harlan
(74) Attorney, Agent, or Firm—Kenneth H. Johnson

(57) ABSTRACT

A slurry polymerization process uses an unsupported catalyst component which is an organometallic complex having a phosphinimine ligand and a cyclopentadienyl-type ligand. The use of the unsupported catalyst component allows simple, inexpensive catalyst addition techniques to be used in a slurry polymerization process. The catalyst component is highly active for ethylene (co)polymerization in the process of this invention.

10 Claims, No Drawings

SLURRY POLYMERIZATION PROCESS USING AN UNSUPPORTED PHOSPHINIMINE CATALYST

FIELD OF THE INVENTION

This invention relates to a slurry process for the copolymerization of ethylene and an alpha olefin using a catalyst system comprising a combination of an unsupported phosphinimine-cyclopentadienyl catalyst and a cocatalyst.

BACKGROUND OF THE INVENTION

Several different polymerization processes are commercially employed for the preparation of ethylene polymers, including those known to persons skilled in the art as "high pressure", "gas phase", "solution" and "slurry".

This invention relates to a slurry polymerization process. In a conventional slurry polymerization process, a "supported" catalyst (i.e. a catalyst which is deposited on a support) is used to initiate ethylene polymerization in a hydrocarbon diluent. The hydrocarbon diluent does not completely dissolve the resulting polymer, thereby creating a slurry of dispersed polymer particles (hence the term "slurry" process). The so-called "Phillips" slurry process for ethylene polymerization is widely reported to use a catalyst consisting of a chromium complex deposited on a metal oxide (such as silica or alumina) and isobutane as the diluent.

A slurry polymerization process which uses a phosphinimine-cyclopentadienyl catalyst in a conventional form (i.e. in supported form) for the preparation of ethylene polymers is disclosed in a copending and commonly assigned patent application (Stephen et al).

We have now discovered that an unsupported phosphinimine-cyclopentadienyl type catalyst may be advantageously used in a slurry polymerization process, thereby eliminating the need to prepare the catalyst in supported form and allowing simple, inexpensive catalyst addition systems to be utilized.

SUMMARY OF THE INVENTION

The present invention provides a slurry process for the copolymerization of ethylene comprising contacting ethylene and at least one other comonomer in a slurry polymerization reactor in the presence of a hydrocarbon diluent, characterized in that said copolymerization is catalyzed by a combination of 1) a phosphinimine catalyst defined by the formula:

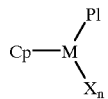

wherein

Cp is selected from the group consisting of unsubstituted cyclopentadienyl, substituted cyclopentadienyl, unsubstituted indenyl, substituted indenyl, unsubstituted fluorenyl and substituted fluorenyl;

Pl is a phosphinimine ligand defined by the formula:

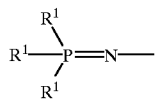

wherein each $R^1$ is independently selected from the group consisting of (a) a hydrogen atom, (b) a halogen atom, (c) $C_{1-20}$ hydrocarbyl radicals which are unsubstituted by or further substituted by a halogen atom, (d) a $C_{1-8}$ alkoxy radical, (e) a $C_{6-10}$ aryl or aryloxy radical, (f) an amido radical (which may be substituted), (g) a silyl radical of the formula:

wherein each $R^2$ is independently selected from the group consisting of hydrogen, a $C_{1-8}$ alkyl or alkoxy radical, $C_{6-10}$ aryl or aryloxy radicals, and (h) a germanyl radical of the formula:

wherein $R^2$ is as defined above; M is a metal selected form the group consisting of titanium, hafnium and zirconium; X is an activatable ligand; n is 1 or 2; and 2) a cocatalyst, with the proviso that said phosphinimine catalyst is unsupported.

DETAILED DESCRIPTION OF PREFERRED EMBODIMENTS

Part 1. Description of Catalysts

The catalyst used in the first reactor of the process of this invention is an organometallic complex of a group 4 metal which is characterized by having one phosphinimine ligand (where the term phosphinimine is defined in section 1.2 below) and one cyclopentadienyl ligand (as described in section 1.3 below).

Any such organometallic having a phosphinimine ligand which displays catalytic activity for ethylene polymerization may be employed. Preferred catalysts are defined by the formula:

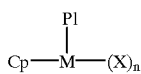

wherein M is a transition metal selected from Ti, Hf and Zr (as described in section 1.1 below); Pl is a phosphinimine ligand (as described in section 1.2 below); Cp is a cyclopentadienyl-type ligand (as described in section 1.3 below); X is an activatable ligand which is most preferably a simple monanionic ligand such as alkyl or a halide (as described in section 1.4 below); and n is 1 or 2 depending upon the valence of the metal M and the valence of the activatable ligand(s) as described in section 1.4.

The most preferred first catalysts are group 4 metal complexes in the highest oxidation state. For example, a catalyst may be a cyclopentadienyl (phosphinimine) complex of titanium, zirconium or hafnium having two additional, monoanionic ligands. It is particularly preferred that the catalyst contains one phosphinimine ligand, one cyclopentadienyl ligand and two chloride or alkyl ligands.

1.1 Metals

The first catalyst is an organometallic complex of a group 4 metal. The preferred metals are titanium, hafnium or zirconium with titanium being most preferred.

1.2 Phosphinimine Ligand

The first catalyst must contain a phosphinimine ligand which is covalently bonded to the metal. This ligand is defined by the formula:

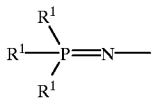

wherein each $R^1$ is independently selected from the group consisting of a hydrogen atom, a halogen atom, $C_{1-20}$ hydrocarbyl radicals which are unsubstituted by or further substituted by a halogen atom, a $C_{1-8}$ alkoxy radical, a $C_{6-10}$ aryl or aryloxy radical, an amido radical, a silyl radical of the formula:

—Si—$(R^2)_3$ wherein each $R^2$ is independently selected from the group consisting of hydrogen, a $C_{1-8}$ alkyl or alkoxy radical, $C_{6-10}$ aryl or aryloxy radicals, and a germanyl radical of the formula:

Ge—$(R^2)_3$ wherein $R^2$ is as defined above.

The preferred phosphinimines are those in which each $R^1$ is a hydrocarbyl radical. A particularly preferred phosphinimine is tri-(tertiary butyl) phosphinimine (i.e. where each $R^1$ is a tertiary butyl group).

1.3 Cyclopentadienyl Ligands

As used herein, the term cyclopentadienyl-type ligand is meant to convey its conventional meaning, namely a ligand having a five carbon ring which is bonded to the metal via eta-5 bonding. Thus, the term "cyclopentadienyl-type" includes unsubstituted cyclopentadienyl, substituted cyclopentadienyl, unsubstituted indenyl, substituted indenyl, unsubstituted fluorenyl and substituted fluorenyl. An exemplary list of substituents for a cyclopentadienyl ligand includes the group consisting of $C_{1-10}$ hydrocarbyl radical (which hydrocarbyl substituents are unsubstituted or further substituted); a halogen atom, $C_{1-8}$ alkoxy radical, a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula —Si—$(R)_3$ wherein each R is independently selected from the group consisting of hydrogen, a $C_{1-8}$ alkyl or alkoxy radical $C_{6-10}$ aryl or aryloxy radicals; germanyl radicals of the formula Ge—$(R)_3$ wherein R is as defined directly above.

1.4 Activatable Ligand

The term "activatable ligand" refers to a ligand which may be activated by a cocatalyst, (or "activator"), to facilitate olefin polymerization. Exemplary activatable ligands are independently selected from the group consisting of a hydrogen atom, a halogen atom, a $C_{1-10}$ hydrocarbyl radical, a $C_{1-10}$ alkoxy radical, a $C_{5-10}$ aryl oxide radical; each of which said hydrocarbyl, alkoxy, and aryl oxide radicals may be unsubstituted by or further substituted by a halogen atom, a $C_{1-8}$ alkyl radical, a $C_{1-8}$ alkoxy radical, a $C_{6-10}$ aryl or aryloxy radical, an amido radical which is unsubstituted or substituted by up to two $C_{1-8}$ alkyl radicals; a phosphido radical which is unsubstituted or substituted by up to two $C_{1-8}$ alkyl radicals.

The number of activatable ligands depends upon the valency of the metal and the valency of the activatable ligand. The preferred first catalyst metals are group 4 metals in their highest oxidation state (i.e. $4^+$) and the preferred activatable ligands are monoanionic (such as a halide—especially chloride or an alkyl—especially methyl). Thus, the preferred first catalyst contains a phosphinimine ligand, a cyclopentadienyl ligand and two chloride (or methyl) ligands bonded to the group 4 metal. In some instances, the metal of the first catalyst component may not be in the highest oxidation state. For example, a titanium (III) component would contain only one activatable ligand.

2. Description of Cocatalyst

The catalyst components described in part 1 above are used in combination with at least one cocatalyst (or "activator") to form an active catalyst system for olefin polymerization as described in more detail in sections 2.1 and 2.2 below.

2.1 Alumoxanes

The alumoxane may be of the formula:

$(R^4)_2AlO(R^4AlO)_mAl(R^4)_2$ wherein each $R^4$ is independently selected from the group consisting of $C_{1-20}$ hydrocarbyl radicals and m is from 0 to 50, preferably $R^4$ is a $C_{1-4}$ alkyl radical and m is from 5 to 30. Methylalumoxane (or "MAO") in which each R is methyl is the preferred alumoxane.

Alumoxanes are well known as cocatalysts, particularly for metallocene-type catalysts. Alumoxanes are also readily available articles of commerce.

The use of an alumoxane cocatalyst generally requires a molar ratio of aluminum to the transition metal in the catalyst from 20:1 to 1000:1. Preferred ratios are from 50:1 to 250:1.

2.2 "Ionic Activators" Cocatalysts

So-called "ionic activators" are also well known for metallocene catalysts. See, for example, U.S. Pat. No. 5,198,401 (Hlatky and Turner) and U.S. Pat. No. 5,132,380 (Stevens and Neithamer).

Whilst not wishing to be bound by any theory, it is thought by those skilled in the art that "ionic activators" initially cause the abstraction of one or more of the activatable ligands in a manner which ionizes the catalyst into a cation, then provides a bulky, labile, non-coordinating anion which stabilizes the catalyst in a cationic form. The bulky, non-coordinating anion permits olefin polymerization to proceed at the cationic catalyst center (presumably because the non-coordinating anion is sufficiently labile to be displaced by monomer which coordinates to the catalyst). Preferred ionic activators are boron-containing ionic activators described in (i)–(iii) below:

(i) compounds of the formula $[R^5]^+[B(R^7)_4]^-$ wherein B is a boron atom, $R^5$ is an aromatic hydrocarbyl (e.g. triphenyl methyl cation) and each $R^7$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula —Si—$(R^9)_3$; wherein each $R^9$ is independently selected from the group consisting of a hydrogen atom and a $C_{1-4}$ alkyl radical; and (ii) compounds of the formula $[(R^8)_tZH]^+[B(R^7)_4]^-$ wherein B is a boron atom, H is a hydrogen atom, Z is a nitrogen atom or phosphorus atom, t is 2 or 3 and $R^8$ is selected from the group consisting of $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^7$ is as defined above; and (iii) compounds of the formula $B(R^7)_3$ wherein $R^7$ is as defined above.

In the above compounds preferably $R^7$ is a pentafluorophenyl radical, and $R^5$ is a triphenylmethyl cation, Z is a nitrogen atom and $R^8$ is a $C_{1-4}$ alkyl radical or $R^8$ taken together with the nitrogen atom forms an anilium radical which is substituted by two $C_{1-4}$ alkyl radicals.

The "ionic activator" may abstract one or more activatable ligands so as to ionize the catalyst center into a cation but not to covalently bond with the catalyst and to provide sufficient distance between the catalyst and the ionizing activator to permit a polymerizable olefin to enter the resulting active site.

Examples of ionic activators include:

triethylammonium tetra(phenyl)boron,
tripropylammonium tetra(phenyl)boron,
tri(n-butyl)ammonium tetra(phenyl)boron,
trimethylammonium tetra(p-tolyl)boron,
trimethylammonium tetra(o-tolyl)boron,
tributylammonium tetra(pentafluorophenyl)boron,
tripropylammonium tetra(o,p-dimethylphenyl)boron,
tributylammonium tetra(m,m-dimethylphenyl)boron,
tributylammonium tetra(p-trifluoromethylphenyl)boron,
tributylammonium tetra(pentafluorophenyl)boron,
tri(n-butyl)ammonium tetra(o-tolyl)boron,
N,N-dimethylanilinium tetra(phenyl)boron,
N,N-diethylanilinium tetra(phenyl)boron,
N,N-diethylanilinium tetra(phenyl)n-butylboron,
N,N-2,4,6-pentamethylanilinium tetra(phenyl)boron,
di-(isopropyl)ammonium tetra(pentafluorophenyl)boron,
dicyclohexylammonium tetra(phenyl)boron,
triphenylphosphonium tetra(phenyl)boron,
tri(methylphenyl)phosphonium tetra(phenyl)boron,
tri(dimethylphenyl)phosphonium tetra(phenyl)boron,
tropillium tetrakispentafluorophenyl borate,
triphenylmethylium tetrakispentafluorophenyl borate,
benzene (diazonium) tetrakispentafluorophenyl borate,
tropillium phenyltrispentafluorophenyl borate,
triphenylmethylium phenyltrispentafluorophenyl borate,
benzene (diazonium) phenyltrispentafluorophenyl borate,
tropillium tetrakis (2,3,5,6-tetrafluorophenyl) borate,
triphenylmethylium tetrakis (2,3,5,6-tetrafluorophenyl) borate,
benzene (diazonium) tetrakis (3,4,5-trifluorophenyl) borate,
tropillium tetrakis (3,4,5-trifluorophenyl) borate,
benzene (diazonium) tetrakis (3,4,5-trifluorophenyl) borate,
tropillium tetrakis (1,2,2-trifluoroethenyl) borate,
triphenylmethylium tetrakis (1,2,2-trifluoroethenyl) borate,
benzene (diazonium) tetrakis (1,2,2-trifluoroethenyl) borate,
tropillium tetrakis (2,3,4,5-tetrafluorophenyl) borate,
triphenylmethylium tetrakis (2,3,4,5-tetrafluorophenyl) borate, and
benzene (diazonium) tetrakis (2,3,4,5-tetrafluorophenyl) borate.

Readily commercially available ionic activators include:

N,N-dimethylaniliniumtetrakispentafluorophenyl borate,
triphenylmethylium tetrakispentafluorophenyl borate, and
trispentafluorophenyl borane.

4. Process Description

The polymerization process according to this invention uses ethylene and other monomers which are copolymerizable therewith such as other alpha olefins (especially those having from three to ten carbon atoms, preferably propene, butene, hexene, octene or styrene) and/or non-conjugated dienes such as hexadiene isomers or cyclic monomers such as ethylidene norbornene.

The present invention may also be used to prepare elastomeric co- and terpolymers of ethylene, propylene and optionally one or more diene monomers. Generally, such elastomeric polymers will contain about 50 to abut 75 weight % ethylene, preferably about 50 to 60 weight % ethylene and correspondingly from 50 to 25% of propylene. A portion of the monomers, typically the propylene monomer, may be replaced by a non-conjugated diolefin. The diolefin may be present in amounts up to 10 weight % of the polymer although typically is present in amounts from about 3 to 5 weight %. The resulting polymer may have a composition comprising from 40 to 75 weight % of ethylene, from 50 to 15 weight % of propylene and up to 10 weight % of a diene monomer to provide 100 weight % of the polymer. Preferred but not limiting examples of the dienes are dicyclopentadiene, 1,4-hexadiene, 5-methylene-2-norbornene, 5-ethylidene-2-norbornene and 5-vinyl-2-norbornene. Particularly preferred dienes are 5-ethylidene-2-norbornene and 1,4-hexadiene.

Polyethylene polymers which may be prepared in accordance with the present invention typically comprise not less than 60, preferably not less than 70 weight % of ethylene and the balance one or more $C_{4-10}$ alpha olefins, preferably selected from the group consisting of 1-butene, 1-hexene and 1-octene. The polyethylene prepared in accordance with the present invention may be linear low density polyethylene having density from about 0.910 to 0.935 g/cc. The present invention might also be useful to prepare polyethylene having a density below 0.910 g/cc—the so-called very low and ultra low density polyethylenes.

The present invention requires a "slurry polymerization process". Slurry polymerization processes are well known to those skilled in the art and widely described in the literature. A brief (overview) description of the process follows. Slurry processes are conducted in the presence of a hydrocarbon diluent such as an alkane (including isoalkanes), an aromatic or a cycloalkane. The diluent may also be the alpha olefin comonomer used in copolymerizations. Preferred examples include propane, butanes, (i.e. normal butane and/or isobutane), pentanes, hexanes, heptanes and octanes. The monomers may be soluble in (or miscible with) the diluent, but the polymer is not (under polymerization conditions). The polymerization temperature is preferably from about 5 to about 110° C., most preferably from about 10 to 80° C. The reaction temperature is selected so that the ethylene copolymer is produced in the form of solid particles. The reaction pressure is influenced by the choice of diluent and reaction temperature. For example, pressures may range from 15 to 45 atmospheres when isobutane is used as diluent (see, for example, U.S. Pat. No. 4,325,849) to approximately twice that (i.e. from 30 to 90 atmospheres) when propane is used (see U.S. Pat. No. 5,684,097). The pressure in a slurry process must be kept sufficiently high to keep at least part of the ethylene monomer in the liquid phase.

The molecular weight of the ethylene copolymer produced by the process may be controlled (reduced) by the addition of hydrogen, as will be appreciated by those skilled in the art.

The present invention requires that the catalyst is added to the reactor in an unsupported form. This is desirable for two reasons, namely that it simplifies the synthesis of the catalyst (by eliminating the need to deposit the catalyst on the support) and it greatly simplifies the catalyst addition procedure. As will be appreciated by those skilled in the art, the addition of supported catalyst particles to a polymerization reactor typically employs a mechanical feeder of complex design. In addition, it can be difficult to meter/measure the flow of solid catalyst particles, and the feeders are prone to pluggage. The unsupported catalyst of the present invention may be easily added to the polymerization reactor, particularly when added together with a flow of the hydrocarbon diluent (or a small amount of solvent for the catalyst).

The slurry polymerization process of this invention produces a slurry of ethylene polymer particles in hydrocarbon diluent. In one embodiment of this invention, the polymer particles are recovered using conventional finishing techniques (for example, an initial "flashing" of the diluent and residual monomer, followed by further devolatilization and/ or catalyst deactivation). The polymer particles may be recovered either in a batch or continuous manner.

In another embodiment of this invention, the ethylene particles are not initially subjected to further devolatilization or catalyst deactivation. Instead, the polymer particles (which still contain active catalyst) are used in second polymerization. The second polymerization may also be a slurry polymerization process. Alternatively, a gas phase process may be employed. The molecular weight distribution of the ethylene polymer may be broadened by such use of two polymerization reactors. The broadening of molecular weight distribution ("MWD") may be readily achieved by persons skilled in the art without undue experimentation. In most instances, the broadening of MWD is easily achieved by simply operating the second reactor at a different reaction temperature than the first. It is desirable to produce ethylene polymers having a molecular weight distribution of greater than 2 (as polymers having a narrow molecular weight distribution are difficult to "process" in polymer mixing equipment). The catalyst used in the process of this invention have a tendency to produce ethylene polymers having a narrow MWD, and the use of two reactors may be employed to mitigate the "mixing" problems this causes.

The second polymerization reaction when used preferably is undertaken in the presence of additional monomer especially ethylene. As will be appreciated by those skilled in the art, this monomer will often contain trace amounts of impurities. These impurities may deactivate the catalyst completely or cause unstable reactor operation as a result of partial catalyst deactivation. Accordingly, it is highly preferred to employ a "poison scavenger". Suitable poison scavengers include metal alkyls (especially aluminum alkyls) and alumoxanes.

EXAMPLES

Example 1

A 2 L autoclave reactor was conditioned at 80° C. under nitrogen pressure and then vacuum, prior to addition of polymerization chemicals. The reactor was cooled to 25° C. and 600 mL of dry, degassed hexane was added followed by 6 mL of a 12.8 weight % solution of methyl aluminoxane ("MAO") in mixed $C_{6-10}$ alkanes. The $C_{6-10}$ mixed alkanes are sold under the trademark Isopar E a commercially available material. This mixture was stirred for 5 minutes at 800 rpm. 20 mg of cyclopentadienyl tri-(tertiary-butyl) phosphinimine titanium dichloride, ["Cp(t-$Bu_3$PN)Ti$Cl_2$"], was then added as a solution in 10 mL of toluene (Al:Ti mole ratio of 500:1). The reactor was heated to a temperature setpoint of 80° C. At 75° C. ethylene addition was initiated. Ethylene was added to bring the reactor to an operating pressure of 220 pounds per square inch gauge (psig). Thereafter, ethylene was added on demand to maintain the reaction pressure at 220 psig throughout the polymerization. After 2 hours of polymerization time, the reactor was rapidly cooled to 25° C., gases were vented off and the slurried polymer was recovered into an evaporation dish. Residual hydrocarbons were evaporated overnight. The recovered yield of polyethylene was 28.4 g. Additional data is presented in Table 1.

Examples 2–4

These examples describe copolymerization experiments performed using the same equipment, procedure and catalyst system as employed in Example 1. Comonomer additions were performed as follows. In Example 2, which describes an ethylene/propylene copolymerization, an approximately 1:1 molar ratio of ethylene:propylene gas was fed to the reactor as the monomer mixture to maintain reactor pressure at 103 psig. In Examples 3 and 4, 20 mL of the liquid comonomer were added to the reactor immediately prior to the addition of the methyl aluminoxane solution and catalyst solution. Thereafter the runs were performed as described in Example 1. Polymerization and polymer data for Examples 1 to 4 is presented in Table 1.

TABLE 1

Polymerization and Polymer Data for Examples 1 to 4

| Example | 1 | 2 | 3 | 4 |
|---|---|---|---|---|
| Comonomer | None | Propylene | 1,5-hexadiene | 1,3-butadiene |
| Comonomer Amount (mL) | 0 | Note 1 | 20 | 20 |
| Polymerization Time (min.) | 120 | 120 | 120 | 31 |
| Polymer Yield (g) | 28.4 | 57 | 75.6 | 42.4 |
| Mw (× $10^{-3}$) | 753 | 142 | 123.6 | 178.8 |
| Mw/Mn | 5.16 | 2.08 | 4.35 | 3.1 |
| Density (g/mL) | 0.9598 |  | 0.9486 | 0.9507 |
| D.S.C. Melting Point (° C.) | 134.3 | 104.9 | 113.4 | 121.5 |

Note 1: A approximately 1:1 molar ratio mixture of ethylene:propylene gas was fed to the reactor throughout the polymerization.
Mw = weight average molecular weight
Mn = number average molecular weight
DSC = Differential Scanning Calorimetry

Example 5

A 2 L autoclave reactor was conditioned at 80° C. under nitrogen pressure and then vacuum, prior to addition of polymerization chemicals. The reactor was cooled to 20° C. and 6 mL of a 12.8 weight % solution of MAO in Isopar-E was then added. This was followed by 20 mg of cyclopentadienyl tri-(tertiary-butyl) phosphinimine titanium dichloride, [Cp(t-$Bu_3$PN)Ti$Cl_2$], which was added as a solution in 5 mL of toluene. 875 mL of liquid propylene was immediately added to the reactor and the temperature was raised to 80° C. Under these conditions the reactor pressure was observed to lie in the range from 405 to 409 psig. After 2 hours of polymerization time the reactor was cooled to 20° C. and residual monomer was removed by evaporation. 48.1 g of polymer with a weight average molecular weight of 90,400 g/mol, a MWD of 2.4, a density of 0.8661 g/mL and a glass transition temperature at −5.7° C. were recovered. The polymer data support the identification of this material as being predominantly atactic polypropylene.

Example 6

This example describes the use of an unsupported catalyst system in a gas phase reactor operation. 160 g of oven-dried sodium chloride was put into a 2 L, autoclave reactor which was then heated to 110° C. and placed under vacuum for 30 minutes. Thereafter the reactor was filled and purged with nitrogen several times. The reactor was then cooled to approximately 25° C. and vented to atmospheric pressure under nitrogen. 5.0 mL of a 3.32 weight % Al solution of MAO in toluene was added to the reactor slowly while stirring the salt bed. The reactor was heated to 85° C. and a mixture of 4 mole percent butene in ethylene was added to bring the reactor pressure to 150 psig. 5 mg of indenyl tri-tertiary-butyl phosphiniminyl titanium dichloride, [Indenyl(t-Bu$_3$PN)TiCl$_2$], as a solution in 2.8 mL of toluene, was added into a catalyst injection apparatus affixed to the reactor. This catalyst solution was then injected into the reactor using 200 psig nitrogen to bring the reactor pressure to a total value of 200 psig. Thereafter, 4 mole percent butene in ethylene was added on demand to maintain the reactor at an operating pressure of 200 psig. The reaction was run for 1 hour after which the reactor was vented and cooled to room temperature. A total of 207 g of solids were recovered from the reactor which indicates the generation of 47 g of polyethylene from this reaction.

Example 7
Ethylene and Styrene Copolymerization

Hexane (500 mL) and 138 mL of styrene were transferred into a 2 L reactor with methylalumoxane (sold under the trademark "PMAO-IP") (3.09 mmol; 0.72 mL) as a cocatalyst. The hexane/styrene solution was heated 90° C. and saturated with 196 psig of ethylene. The catalyst, CpTiNPtBu$_3$Cl$_2$, (12.7 mmol; 4.2 mg) was dissolved in toluene (4 mL). The catalyst solution was loaded into a catalyst injection bomb and then injected into the reactor. Polymerization was immediately observed and the reaction temperature rose to 95° C. The polymerization reaction was terminated by cooling down the reactor and by diluting the reactor with excess argon after 25 minutes. A minor amount of atactic polystyrene was extracted from the copolymer by dichloromethane. The purified ethylene-styrene copolymer was analyzed by carbon NMR and found to have 4.2 ethylene-styrene-ethylene triad units per 1000 carbon atoms. Yield=60.4 g. Activity=1.38*10$^4$ g/mmolcat*Hr. Polymer melting point=125.5° C.

Example 8
Dual Reactors Experiment (First Reactor: Slurry Phase; Second Reactor: Gas Phase)

Pentane (500 mL) was transferred into the reactor with methylalumoxane "PMAO-IP" (12.2 mol; 2.25 mL) as a cocatalyst. The solution was heated to 90° C. and saturated with 120 psig of ethylene. The catalyst, CpTiNPtBu$_3$Cl$_2$, (12.7 mmol; 4 mg) was dissolved in toluene (4 mL). The catalyst solution was loaded into a catalyst injection bomb and then injected into the reactor. 14.4 L of the ethylene was consumed after 8.5 minutes. The reaction was stopped by venting off the reactor at 90° C., and the solvent was captured in a solvent trap in the ventline. The reactor was repressurized with ethylene to 120 psig. The gas phase polymerization happened immediately and the reactor temperature increased to 107° C. The polymerization reaction was terminated by cooling down the reactor and by diluting the reactor with excess argon. 5.7 L of ethylene was consumed at the second stage. Yield=12.9 g of PE. Activity= 2.86*10$^6$ gPE/mmolcat*Hr.

What is claimed is:

1. A slurry process for the copolymerization of ethylene comprising contacting ethylene and at least one other comonomer in a slurry polymerization reactor in the presence of a hydrocarbon diluent, characterized in that said copolymerization is catalyzed by a combination of 1) a phosphinimine catalyst defined by the formula:

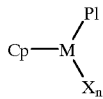

wherein Cp is selected from the group consisting of unsubstituted cyclopentadienyl, substituted cyclopentadienyl, unsubstituted indenyl, substituted indenyl, unsubstituted fluorenyl and substituted fluorenyl;

Pl is a phosphinimine ligand defined by the formula:

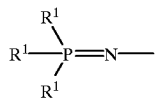

wherein each R$^1$ is independently selected from the group consisting of (a) a hydrogen atom, (b) a halogen atom, (c) C$_{1-20}$ hydrocarbyl radicals which are unsubstituted by or further substituted by a halogen atom, (d) a C$_{1-8}$ alkoxy radical, (e) a C$_{6-10}$ aryl or aryloxy radical, (f) an amido radical (which may be substituted), (g) a silyl radical of the formula:

wherein each R$^2$ is independently selected from the group consisting of hydrogen, a C$_{1-8}$ alkyl or alkoxy radical, C$_{6-10}$ aryl or aryloxy radicals, and (h) a germanyl radical of the formula:

wherein R$^2$ is as defined above; M is a metal selected form the group consisting of titanium, hafnium and zirconium; X is an activatable ligand; n is 1 or 2, depending upon the valence of said metal M; and 2) a cocatalyst with the proviso that said phosphinimine catalyst is unsupported.

2. The process of claim 1 wherein said at least one comonomer is selected from the group consisting of alpha olefins having from 3 to 10 carbon atoms.

3. The process of claim 1 wherein said hydrocarbon diluent is selected from the group consisting of normal and iso alkanes having from 4 to 10 carbon atoms and propene.

4. The process of claim 1 wherein said cocatalyst is selected from the group consisting of alumoxanes and ionic activators.

5. The process of claim 1 wherein a copolymer is removed from said slurry polymerization reactor then employed as a polymer-supported catalyst system in a subsequent gas phase ethylene polymerization process.

6. The process of claim 5 wherein said subsequent gas phase ethylene polymerization process is conducted in the presence of A) said polymer-supported catalyst system and B) a poison scavenger.

7. The process of claim 1 wherein said poison scavenger is selected from the group consisting of aluminum alkyls and alumoxanes.

8. The process of claim 5 wherein said slurry polymerization reactor is operated at a temperature of from 5 to 110° C. and a pressure of from 15 to 90 atmospheres and in the presence of at least one diluent selected from propane, butane, isobutane, pentane and isopentane.

9. The process of claim 1 wherein said at least one comonomer includes a) an alpha olefin having from 3 to 10 carbon atoms and b) a non-conjugated diene.

10. The process of claim 1 wherein said cyclopentadienyl ligand is unsubstituted cyclopentadienyl; said phosphinimine ligand is tri (tertiary butyl) phosphinimine; M is titanium; n is two and each activatable ligand is selected from the group consisting of chloride, bromide, and hydrocarbyl having from 1 to 10 carbon atoms.

* * * * *